Figure 1:
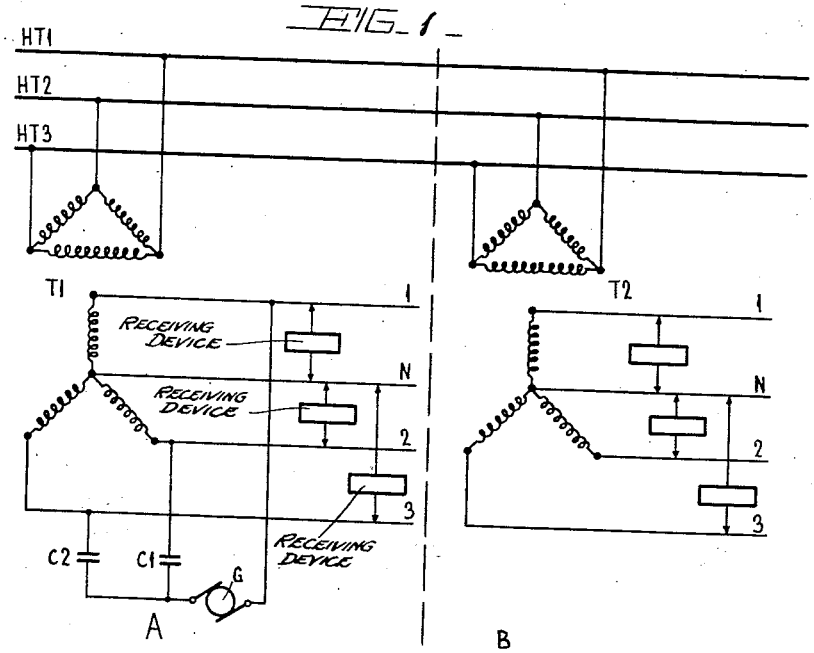

INVENTORS:
PHILIP NORTON ROSEBY
JOHN FRANCIS MACKENZIE
BY
ATTORNEY.

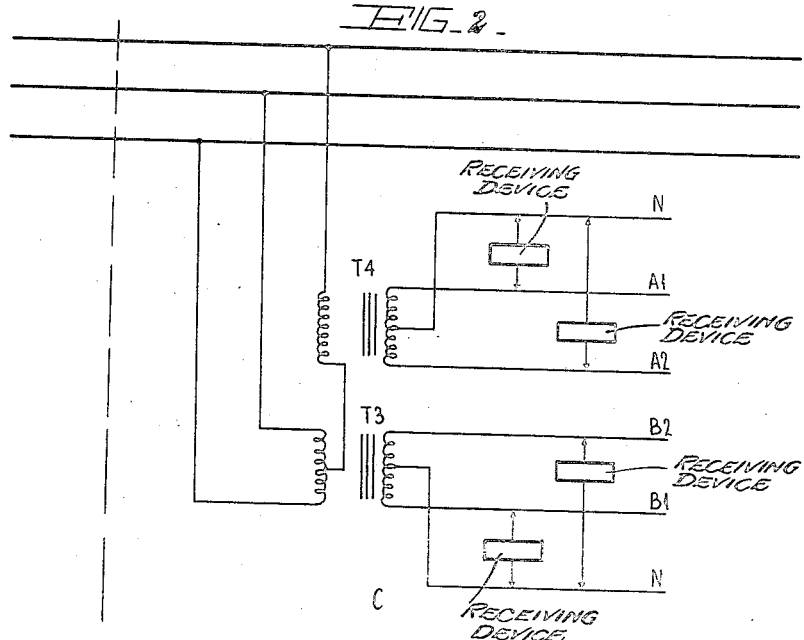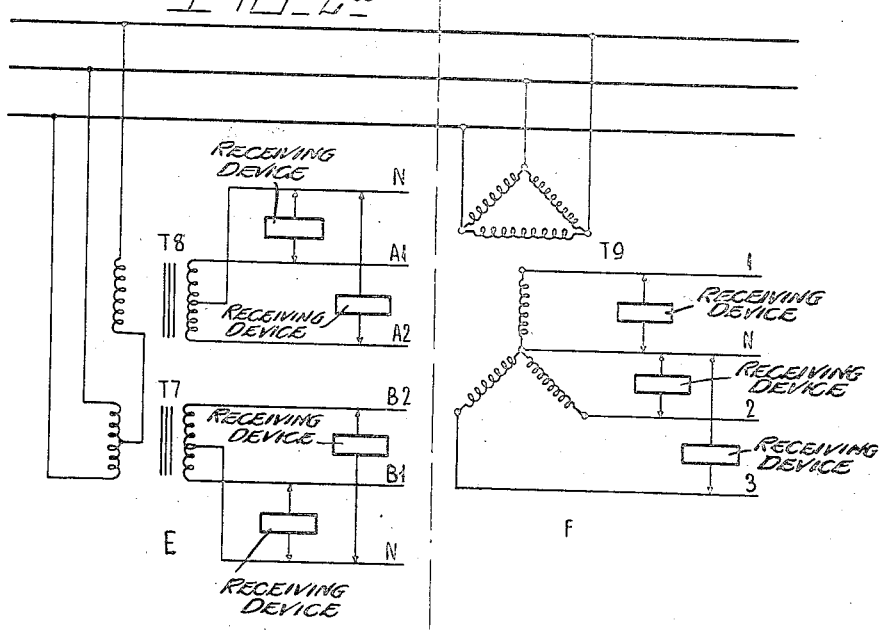

Patented May 18, 1943

2,319,633

UNITED STATES PATENT OFFICE 2,319,633

ELECTRICAL SIGNALING SYSTEM

Philip Norton Roseby, Woodvale, and John Francis Mackenzie, Liverpool, England, assignors to Associated Telephone & Telegraph Company, Chicago, Ill., a corporation of Delaware Application September 16, 1939, Serial No. 295,210
In Great Britain October 24, 1938

2 Claims. (Cl. 177—352)

The present invention relates to electrical signaling systems and is more particularly concerned with centralised control systems in which signaling is effected over alternating current electric supply networks by the use of currents of high frequency compared with the supply frequency, the arrangements being of the well known type in which a high tension network feeds a plurality of connected low tension networks.

Where it has been desired to superimpose the signaling energy on all the phases of the high and low tension networks simultaneously previous systems of this type have employed polyphase high frequency generators located at a controlling point which apply the high frequency signaling energy either in parallel via condensers or via special series transformers direct to the high tension lines whence the energy finds a path by way of the HT/LT transformers to the phase leads of the various connected low tension networks.

The present invention has for its object the provision of a simplified and less expensive system of the above type in which single phase high frequency generators may be employed at the controlling point and in which no direct connections are required to the H. T. circuits, the use of expensive protecting gear and high voltage breakdown coupling components being thereby avoided.

According to one feature of the invention in an electrical signaling system for the operation of control devices in response to high frequency currents transmitted over electric supply mains, the high frequency currents are applied from a single phase generator by way of a transformer to all the phases of a polyphase high tension network over which the high frequency circuits are transmitted to one or more low tension networks fed therefrom on which they appear on all phases.

According to another feature of the invention in an electrical signaling system for the operation of control devices in response to high frequency currents transmitted over electric supply mains, signals are transmitted over a high tension network by the application of high frequency currents from a single phase generator to a three-phase four-wire low tension network fed from the high tension network, the connection of the generator being from the neutral or one phase conductor to two other phase conductors in parallel by way of coupling condensers of substantially equal value.

A further feature of the invention is that in an electric signaling system for the operation of control devices in response to high frequency currents transmitted over electric supply mains, signals are transmitted over a three-phase high tension network by the application of high frequency currents from a single phase generator to a Scott-connected six-wire two-phase network fed from the high tension network, the connection of the generator being between the inner or between the outer terminals of the main and teaser transformers.

Figure 1A:
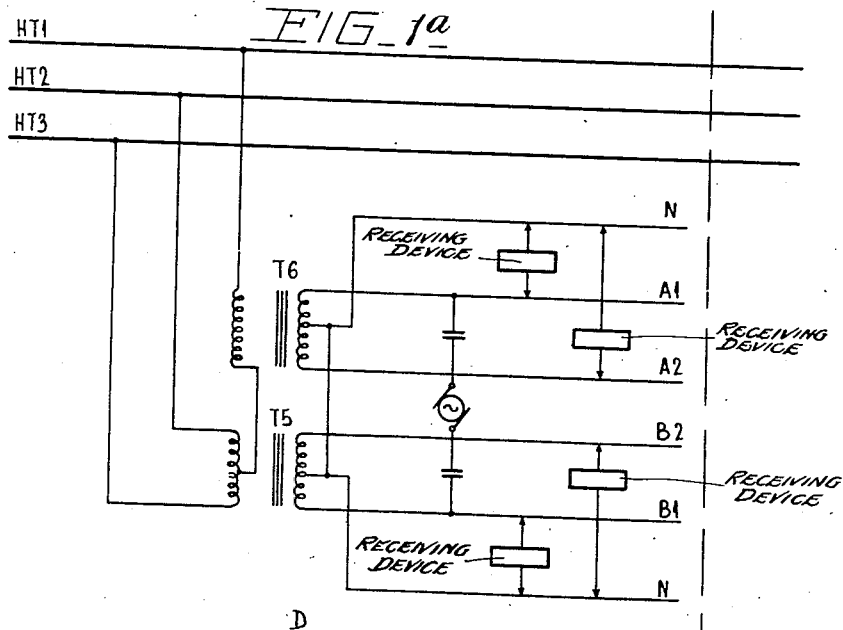

The invention will be better understood from the following description of two methods of carrying it into effect, reference being had to the accompanying drawings comprising Figs. 1 and 2 which when arranged side by side show in their upper and lower parts respectively circuit connections of two preferred embodiments of the invention, firstly, one in which centralised control is effected from a three-phase four-wire L. T. network and secondly one shown in Figs. 1a and 2a in which the control is effected from a Scott-connected two-phase network. In both cases the signals may be employed for the control of street lighting tariff change or analogous purposes.

In the first arrangement, it will be assumed that centralised control is to be effected from substation A at which is located a main HT/LT transformer T1 arranged on a star-delta basis and to which a supply is provided from the H. T. network comprising the leads HT1, HT2 and HT3 to the three-phase four-wire L. T. network comprising the phase leads 1, 2 and 3 and neutral lead N. High frequency signals are generated by the generator G which may be of the static type using thermionic valves or of the motor-driven high frequency alternator type. This is connected on one side to the phase lead 1 and on the other side to the phase leads 2 and 3 via the coupling condensers C1 and C2 respectively which are of substantially equal capacity and of such value as to form a tuned circuit and give maximum output. The value is also such that they offer high impedance to the 50 cycle mains supply current and low impedance to the high frequency signaling currents. It will be understood that the connections from the generator may be taken to any of the phase leads or to the neutral provided the general arrangement shown is preserved.

On the starting up of the generator, high frequency signaling current flows therefrom down one of the L. T. phase legs of the transformer T1 and returns through the other two legs in parallel via the coupling condensers and as a result it is induced into the delta-connected primary winding and appears on all phases of the H. T. network. At the same time it appears across all phases to neutral of the local L. T. network and serves to operate the responding devices shown which may be connected between any of the phase leads and the neutral. The high frequency signals in extending over the H. T. network find a path down through the main transformers of all the connected L. T. networks and appear on all phases thereof.

For the purpose of illustration two receiving substations B and C are shown. Substation B shown in Fig. 1 is assumed to connect like substation A with a three-phase four-wire network. Substation C in Fig. 2 is provided with a three-phase to two-phase transformation arrangement of the well-known Scott type comprising a main transformer T3 and a so-called teaser transformer T4. In connection with the latter network the neutral leads are again designated N and the other pairs of leads A1 and A2, B1 and B2 are displaced in phase.

It will be understood that although only two different types of networks have been shown the invention could be applied to other types which are not so usually encountered in practice.

As regards the H. T. network, further stages of transformation may appear between a signaling substation and any of the receiving substations without detriment to the operation of the system.

In particularly large areas where the signaling energy needs to be of a comparatively high value in order that it will satisfactorily reach the more distant L. T. networks, it may be undesirable to utilize the existing service transformer for the purpose of the injection on to the H. T. network and in such a case a transformer specially allocated or designed for the particular purpose might be utilised.

Consideration will now be given to the second embodiment of the invention. It is here assumed that control is to be effected from substation D at which the three-phase H. T. network is Scott-connected to a two-phase L. T. network. In this case the high frequency generator may be connected as shown in full lines across the outer terminals of the L. T. windings of the main transformer T5 and teaser transformer T6 or it may be connected across the inner terminals of these windings. By these connections it is possible to signal on all phases both of the local two-phase network and also via the H. T. network on all phases of the other networks such as E and F, Fig. 2. It will be noted that although the neutral leads of the two-phase network E are segregated, those of network D are coupled together in accordance with the more usual practice and these particular connections are necessary where such a network is selected for the purpose of performing centralised control.

In the system according to the invention if use is made of sensitive responding devices for instance of the slow beat or cadence type described in the British Patent No. 518,877, accepted March 11, 1940, it is readily possible to effect centralised control with a comparatively small size of high frequency generator at the controlling point without the necessity for repeat equipment at the distant substations.

We claim:

1. In an electric supply system, wherein a plurality of low tension networks are supplied with power from a three phase high tension line, a signaling system comprising a single phase high frequency generator, a plurality of control devices connected to one low tension network, said generator connected in series with condensers directly between one of the leads of another of said low tension networks and two of the other leads of said other low tension network in parallel and circuits for operating the control devices of a network including said high frequency current generator, said one low tension network, said high tension supply circuit, the other low tension network, and the control device.

2. In an electrical supply system, wherein a plurality of low tension networks are supplied with power from a three-phase high tension network through transformers, a signaling system comprising a single phase high frequency generator connected directly to one low tension network between certain of the terminals of the transformer of that network on the low tension side thereof in series with condensers, control devices each connected to a pair of the leads in another of the low tension networks on the low tension side of the transformer thereof, and a circuit for operating each device including said generator and a portion of both low tension networks and the high tension network.

PHILIP NORTON ROSEBY.
JOHN FRANCIS MACKENZIE.